US008675484B2

(12) United States Patent
Radunovic et al.

(10) Patent No.: US 8,675,484 B2
(45) Date of Patent: Mar. 18, 2014

(54) RECEIVING DATA IN A SENSOR NETWORK

(75) Inventors: Bozidar Radunovic, Clichy (FR); Hong L. Truong, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 13/089,502

(22) Filed: Apr. 19, 2011

(65) Prior Publication Data

US 2011/0194413 A1  Aug. 11, 2011

Related U.S. Application Data

(60) Division of application No. 12/716,716, filed on Mar. 3, 2010, now Pat. No. 8,130,669, which is a division of application No. 12/190,829, filed on Aug. 13, 2008, now Pat. No. 7,738,394, which is a continuation of application No. 11/411,396, filed on Apr. 26, 2006, now abandoned.

(30) Foreign Application Priority Data

Apr. 26, 2005 (EP) .................................. 05009063

(51) Int. Cl.
 *G01R 31/08* (2006.01)
(52) U.S. Cl.
 USPC ........................................ 370/230; 455/422.1
(58) Field of Classification Search
 USPC .............. 370/310–333, 230; 455/422.1–460, 455/524–525
 See application file for complete search history.

(56) References Cited

U.S. PATENT DOCUMENTS

| 4,955,050 | A | * | 9/1990 | Yamauchi ..................... 455/555 |
| 5,363,369 | A | | 11/1994 | Hemmady et al. |
| 5,434,854 | A | * | 7/1995 | Focarile et al. ............... 370/335 |
| 5,438,565 | A | * | 8/1995 | Hemmady et al. ............ 370/335 |
| 5,875,183 | A | * | 2/1999 | Nitadori ........................ 370/328 |
| 5,898,681 | A | | 4/1999 | Dutta |
| 6,157,616 | A | | 12/2000 | Whitehead |
| 6,567,420 | B1 | | 5/2003 | Tiedemann, Jr. et al. |
| 6,714,551 | B1 | | 3/2004 | Le-Ngoc |
| 6,775,541 | B2 | | 8/2004 | Dillon et al. |
| 6,865,393 | B1 | | 3/2005 | Baum et al. |
| 6,999,729 | B2 | | 2/2006 | Wandel |

(Continued)

OTHER PUBLICATIONS

F. Althus et al., A comprehensive investigation of UMB Sensor Networks for Industrial Applications, 15th 1st Mobile & Wireless Communications Summer 2006. (From Applicant's IDS filed on Apr. 8, 2011).*

(Continued)

*Primary Examiner* — Mark Rinehart
*Assistant Examiner* — Mang Yeung
(74) *Attorney, Agent, or Firm* — Cantor Colburn LLP; Vazken Alexanian

(57) ABSTRACT

A sensor network has a plurality of wireless sensors which transmit to an intermediate receiving device which relays data to a central server. A method is provided for receiving data packets at the intermediate receiving device from a plurality of the transmitting devices. Data packets are sensed on a communication medium at the receiving device and the total traffic intensity of data packets from the transmitting devices is estimated. A detection threshold for data packets is provided and adapted as a function of the total intensity. The receiving device receives data packets with a signal strength above the current detection threshold.

16 Claims, 9 Drawing Sheets

(56) References Cited

U.S. PATENT DOCUMENTS

| | | |
|---|---|---|
| 7,042,391 B2 | 5/2006 | Meunier et al. |
| 7,113,497 B2 | 9/2006 | Cromer et al. |
| 7,117,017 B2 | 10/2006 | Chen et al. |
| 7,200,374 B1 | 4/2007 | Stephens |
| 7,209,467 B2 | 4/2007 | Liu et al. |
| 7,286,474 B2 | 10/2007 | Garg et al. |
| 2002/0150063 A1 | 10/2002 | Tran |
| 2002/0186657 A1 | 12/2002 | Jain et al. |
| 2004/0001467 A1 | 1/2004 | Cromer et al. |
| 2004/0063438 A1 | 4/2004 | Hsu et al. |
| 2004/0146092 A1 | 7/2004 | Balakrishnan et al. |
| 2005/0124369 A1 | 6/2005 | Attar et al. |
| 2005/0141547 A1 | 6/2005 | Cho et al. |
| 2005/0193225 A1 | 9/2005 | Macbeth et al. |
| 2005/0276221 A1 | 12/2005 | Olesinski et al. |
| 2006/0176815 A1 | 8/2006 | Picot et al. |

OTHER PUBLICATIONS

B. Radunovic et al., Receiver Architectures for UWB-Based Transmit-Only Sensor Network, Ultra-Wideband, IEEE International Conference on Sep. 5-8, 2005; pp. 379-384. (From Applicant's IDS filed on Apr. 8, 2011).*

F. Althus et al; "A Comprehensive Investigation of UWB Sensor Networks for Industrial Applications;" 15th 1st Mobile & Wireless Communications Summit 2006; nari.ee.ethz.ch/wireless/pubs/files/ist2006.pdf.

B. Radunovic et al.; "Receiver Architectures for UWB-Based Transmit-Only Sensor Network, Ultra-Wideband;" IEEE International Conference on Sep. 5-8, 2005; pp. 379-384.

* cited by examiner

RECEIVING DATA IN A SENSOR NETWORK

CROSS-REFERENCE TO RELATED APPLICATIONS

This is a divisional application of application Ser. No. 12/716,716, filed Mar. 3, 2010, now U.S. Pat. No. 8,130,669, which is a divisional application of application Ser. No. 12/190,829, filed Aug. 13, 2008, now U.S. Pat. No. 7,738,394, which is a continuation of application Ser. No. 11/411,396, filed Apr. 26, 2006, now abandoned, which claims priority to Application No. EP05009063, filed Apr. 26, 2005.

TECHNICAL FIELD

This invention relates to the field of receiving data in a sensor network and it particularly relates to cluster head design in transmit-only wireless sensor networks.

BACKGROUND

There has been a recent increase in demand for wireless sensor networks, due to their simplicity, low cost and easy deployment. Wireless sensor networks can serve different purposes, from measurement and detection, to automation and process control.

A typical wireless sensor network consists of sensor nodes (SNs) and sinks. SNs are wireless nodes equipped with sensing devices whose goal is to gather data in the environment and transmit it to a central server. It is advantageous if the transmission is wireless, since the number of sensors is typically very large, and the cost of deployment of a wired infrastructure would be more expensive.

In order to have a longer lifetime, SNs typically use smaller transmission powers. The area covered by a sensor network may be large enough that intermediate devices are useful to relay data. These devices are data sinks and are called cluster heads (CHs). A CH is a device whose task is to capture transmissions of SNs in its environment, optionally do some limited processing of the data, and to forward the data to a central server. One CH is responsible for coordinating a number of SNs: for a network of 100 SNs, there may be less than 10 CHs, depending on the network area.

Since there are much fewer CHs than SNs, they can be more expensive. They can rely on more sophisticated wireless technology to transmit data to the central server, or in some cases they can also be wired.

In many applications of sensor networks, a network is desired to cope with bursts of high data rates. One example is an intrusion detection network, where once an intruder is detected, a number of sensors, including video cameras, are activated to inform about the intrusion. A similar example is a fire detection problem. In these applications it is seen that, even though the average packet rates are relatively low e.g. since intrusion or fire events are typically rare events, a network is desired to be able to support higher rate bursts.

BRIEF SUMMARY

The present invention provides a sensor network for lower average data-rates, which is able to better handle sudden bursts of traffic. According to a first aspect of the present invention there is provided a method for receiving data packets from a plurality of transmitting devices at a receiving device, comprising: sensing data packets transmitted on a communication medium; estimating the total traffic intensity of data packets generated by the transmitting devices; setting a detection threshold for receiving data packets as a function of the total traffic intensity; ignoring data packets with a received signal strength below the detection threshold; and receiving data packets with a received signal strength above the detection threshold.

According to a second aspect of the present invention there is provided a receiving device for receiving data packets from a plurality of transmitting devices, comprising: a receiving circuit for receiving data packets with a received signal strength above a current detection threshold; estimator for the total traffic intensity of data packets generated by transmitting devices; controller for setting the detection threshold for receiving data packets as a function of the total traffic intensity.

According to a third aspect of the present invention there is provided a computer program product stored on a computer readable storage medium, comprising computer readable program code means for performing the steps of: sensing data packets transmitted on a communication medium; estimating the total traffic intensity of data packets generated by the transmitting devices; adapting a detection threshold for receiving data packets as a function of the total intensity; ignoring data packets with a received signal strength below the current detection threshold; and receiving data packets with a received signal strength above the current detection threshold.

According to a fourth aspect of the present invention, there is provided a sensor network comprising: a plurality of wireless sensors having transmitters; one or more receiving devices; and a central server for receiving data from the one or more receiving devices; wherein the one or more receiving devices comprising: a receiving circuit for receiving data packets from the sensors, the data packets having a signal strength above a current detection threshold; an estimator for the total traffic intensity of data packets generated by the sensors; a controller for adapting the detection threshold for receiving data packets as a function of the total traffic intensity; and a transmitter for transmitting received data to the central server.

BRIEF DESCRIPTION OF THE SEVERAL VIEWS OF THE DRAWINGS

The invention and its embodiments will be more fully appreciated by reference to the following detailed description of presently advantageous but nonetheless illustrative embodiments in accordance with the present invention when taken in conjunction with the accompanying drawings, in which.

DETAILED DESCRIPTION

Figure 1:
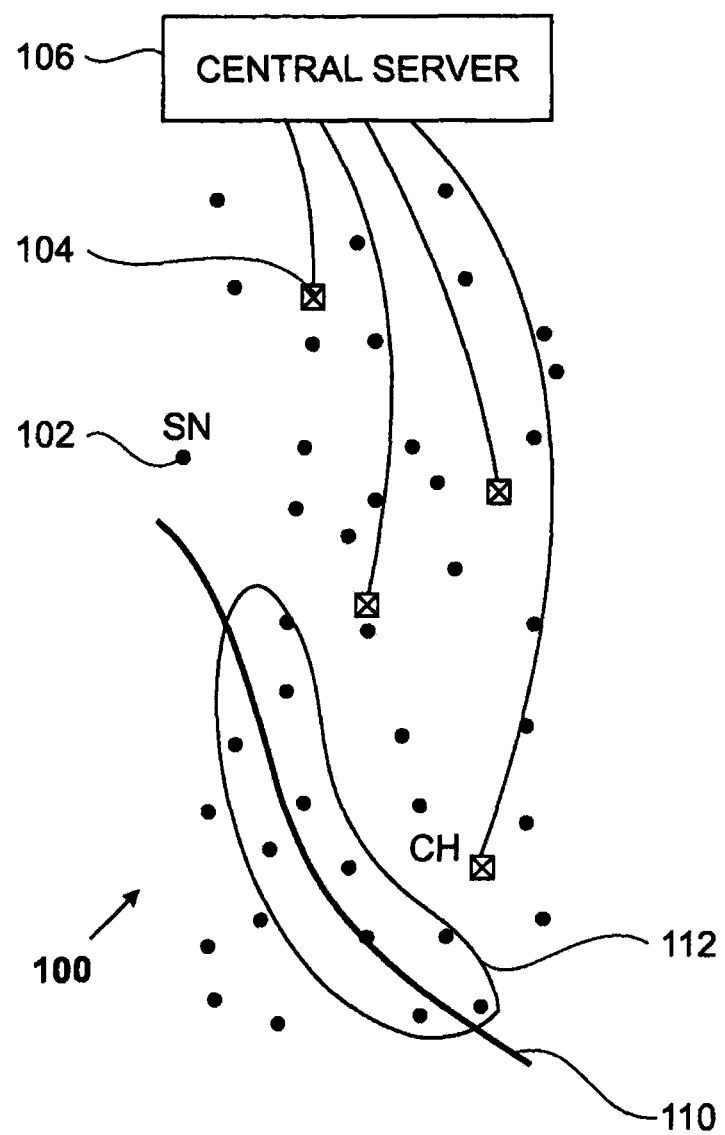
FIG. 1 is a schematic diagram of a sensor network.

The present invention provides methods, apparatus and systems for a sensor network for lower average data-rates, that are able to better handle sudden bursts of traffic. A goal of improved cluster head design is to increase the number of captured packets. There are two different traffic cases, one being referred to as low network traffic, the other as high network traffic. The distinction between these two cases can be made by defining an intensity threshold. For example low network traffic could be defined as the case when portion of time that a cluster head does not sense a packet transmission is larger than the time during which it does sense a packet transmission. In contrast thereto then high network traffic might be defined as the case when the portion of time that a cluster head does not sense a packet transmission is shorter than the time during which it does sense a packet transmission. There can be used other definitions, for instance those that define the intensity threshold in dependence on an overlap probability between two or more packets being sensed at a cluster head.

In the case of low network traffic, each cluster head should try to capture each transmitted packet since packets transmissions are rather rare. Should one cluster head drop the packet due to fading or interference, there is a chance that other cluster heads will capture it. However, when the traffic is high, the reasoning is different. If a cluster head tries to decode a packet from a distant sensor, there is a higher probability that another interfering packet will arrive in the meantime from a closer sensor. The interfering packet will destroy the content of the receiving packet due to its overwhelming power. Furthermore, since the cluster head was busy receiving the packet from the distant sensor, it did not even try to receive the interfering packet and it ends up losing both packets.

The present invention is concerned with cluster head design. A straightforward solution to the above problem is to have multiple receiver circuits at each cluster head. However, receiver circuits are expensive. The invention proposes a solution that mitigates the problem and does not drastically increase the cost of a cluster head.

A first architecture of the present invention is based on a notion of a detection threshold. If the received signal strength of a packet at a cluster head is below a detection threshold, the cluster head will not even try to receive the packet, and thus will not keep the circuits connected to it busy during the duration of the packet. An algorithm is proposed that tracks and adapts the detection threshold at a cluster head, as a function of total traffic, in order to increase the capture probability. When the traffic is low, the detection threshold is low, and in the ideal case all the packets are detected. When the traffic increases, the threshold increases gradually to keep the performance at a predetermined level. This predetermined level will in an ideal case be a level trying to capture as many packets in an uncorrupted state as possible. Although the hardware requirements are the same as for the simple receiver, this approach can bring significant improvements during burst periods. In the context of the invention, low traffic is referred to as traffic whose traffic intensity lies below a predetermined intensity threshold, while high traffic is traffic whose intensity lies above that intensity threshold. A possible determination rule for the intensity threshold could be to set the threshold at a value at which within a predetermined time window the aggregated time during which the cluster head does not sense any packet, also referred to as idle time, is above or below e.g. 20% of the time window duration. More data traffic means a shorter idle time; hence the traffic falls within the high data traffic category. Less data traffic means a longer idle time, hence the traffic falls within the low data traffic category. Any other determination rule can be used as well to determine the traffic intensity threshold.

A second architecture of the present invention is referred to as switched architecture. An additional detection and synchronization circuit is added to the existing receiver's design. The goal of this additional circuit is to detect an arrival of a packet whose signal strength is stronger than the one currently being decoded. Should it happen, the main receiver circuit drops the current packet and switches to the stronger one. Obviously, the hardware cost of this receiver is higher than the cost of the simple one. However, this approach brings an additional performance improvement over a cluster head with adaptive threshold. It is thus suited for scenarios where the improvements of cluster heads with adaptive thresholds are not sufficient.

Thus, the present invention provides a method for receiving data packets from a plurality of transmitting devices at a receiving device, comprising: sensing data packets transmitted on a communication medium; estimating the total traffic intensity of data packets generated by the transmitting devices; setting a detection threshold for receiving data packets as a function of the total traffic intensity; ignoring data packets with a received signal strength below the detection threshold; and receiving data packets with a received signal strength above the detection threshold.

Preferably, when the total traffic intensity is lower than a predetermined intensity threshold, the detection threshold is decreased. By this decreasing of the detection threshold, typically more packets will be sensed such that the traffic intensity will increase. When the traffic intensity then increases over the intensity threshold, the detection threshold is increased again. Thereby the traffic intensity can be held within a predetermined range around the intensity threshold. Thereby the probability of packet loss can be held at a predetermined level even with varying traffic intensity. The detection threshold may be adapted for every data packet sensed. So the method is suited to keep the traffic intensity at a predetermined level.

The method may include tracking and estimating the traffic intensity and the utilization at the receiving device and adapting the detection threshold to keep the utilization at a predetermined level. The traffic intensity may be estimated by a packet duration divided by the average idle time at the receiving device. The utilization at the receiving device may be estimated by a packet duration divided by the average time between two successful packet receptions. The estimated traffic intensity and utilization may be continually updated, i.e. updated at regular or irregular time intervals, e.g. after a predetermined number of packets received. The method may include maintaining a list of active transmitting devices, i.e. devices whose packets are sensed and their received signal strengths.

For increased performance the total traffic intensity is preferably maintained at approximately 75% of the physical layer rate and the utilization is preferably maintained at approximately 22%.

The detection threshold may be conservatively increased by only increasing the threshold if the traffic intensity has been detected to be increasing over a number of instances.

The detection threshold may be conservatively increased in that the detection threshold is increased if it is detected a predetermined number of times in succession that the total traffic intensity is greater than 75% and the utilization is less than 22%. The detection threshold may be decreased if the total traffic intensity is less than 75% and the utilization is less than 22%.

The present invention also provides a receiving device for receiving data packets from a plurality of transmitting devices, comprising: a receiving circuit for receiving data packets with a received signal strength above a current detection threshold; estimator for the total traffic intensity of data packets generated by transmitting devices; controller for setting the detection threshold for receiving data packets as a function of the total traffic intensity.

The device may include a sensor for data packets on a communication medium at the receiving device. The device may also include a list of active transmitting devices and their received signal strengths.

The present invention further provides a computer program product stored on a computer readable storage medium, comprising computer readable program code means for performing the steps of: sensing data packets transmitted on a communication medium; estimating the total traffic intensity of data packets generated by the transmitting devices; adapting a detection threshold for receiving data packets as a function of the total intensity; ignoring data packets with a received signal strength below the current detection threshold; and receiving data packets with a received signal strength above the current detection threshold.

The present invention still further provides a sensor network comprising: a plurality of wireless sensors having transmitters; one or more receiving devices; and a central server for receiving data from the one or more receiving devices; wherein the one or more receiving devices comprising: a receiving circuit for receiving data packets from the sensors, the data packets having a signal strength above a current detection threshold; an estimator for the total traffic intensity of data packets generated by the sensors; a controller for adapting the detection threshold for receiving data packets as a function of the total traffic intensity; and a transmitter for transmitting received data to the central server. The network may operate on a pulse-based ultra-wide band physical layer.

Referring first to FIG. 1, a described embodiment of a wireless sensor network 100 is shown. The sensor network 100 comprises multiple sensor nodes (SNs) 102 which are wireless nodes equipped with sensing devices and transmitters. The sensor network 100 includes intermediate devices in the form of cluster heads (CHs) 104. Each CH 104 receives data from SNs 102 in the local vicinity of the CH 104 and relays the data to a central server 106. The CHs 104 may optionally carry out some processing of the data captured in the transmissions from SNs 102 before relaying the data to the central server 106. The CHs 104 may use wireless technology for communication with the central server 106, or may use wired links.

The physical layer of the network of the described embodiment of a sensor network 100 is based on non-coherent pulsed UWB (ultra-wide band) radio. The advantages of this radio are that it has a lower design complexity, provides sufficiently high data rates (for example, 5 Mbps link rate), and has a lower power dissipation and better ranging capabilities. It comprises sending pulses of the order of 1 ns duration. Sensor networks 100 based on pulse-based UWB are location-aware, which is a desirable feature for applications such as location tracking and intrusion detection.

Furthermore, implementing a transmitter is simpler and cheaper, even comparing to a receiver for the same radio. Since it is desirable to provide low-cost networks, in order to further decrease the cost, a receiver is not implemented in a SN 102, but only a transmitter. This makes the SNs 102 unaware of the state of the network 100, and the networking logic is implemented in the CHs 104. However, in alternative embodiments, the SNs 102 of a network 100 may also include data receivers.

It is noted that the described sensor network uses a non-coherent pulsed UWB radio physical layer. However, the described design may be used with any networks with transmit-only SNs.

The sensor network 100 comprises multiple SNs 102, which can amount to a relatively large number. These SNs 102 are therefore desired to be designed rather simply and at a reduced cost. A sensor network 100 should ideally be able to cope with relatively high data rates and offer location capabilities, and focus the SNs 102 with pulse-based UWB physical layer. Pulse-based UWB transmitters are cheap and simple to implement; nevertheless, even a simple, non-coherent receiver, uses complex elements, such as a synchronization circuit, and may be too expensive for low-end SNs.

In the described embodiment a network of transmit-only SNs 102 is provided, equipped with sensing and transmitting devices. These SNs 102 measure some data and transmit it to CHs 104. They can use an arbitrary medium access scheme, but this scheme depends only on the available data. The SNs 102 cannot sense the medium nor can they receive any feedback from CHs 104 or other SNs 102.

The choice of sensor architecture implies that most of the design complexity is in the CHs 104.

Sensor networks 100 are usually low-data-rate networks. The main reason is that low traffic, hence low average data rates imply lower power dissipation and longer network lifetime. However, even with a low average data rate, the peak traffic may still be high, but only during infrequent time intervals. A network 100 should be designed in such a way that it can increase its performance both during low traffic intervals and high traffic bursts.

An example embodiment of a sensor network 100 is a surveillance system. An underground car park is filled with sensors. There are several types of sensors; seismic, infrared and microphone sensors are used to detect movements of an intruder. In addition, there are video sensors that are activated only if some activity has already been detected. SNs 102 transmit data to CH 104, that collect it and forward it to a central server 106. Typical networks 100 of this type consist of 10-100 SNs, with rates up to 400 kbps when video transmissions are activated. The aggregated input traffic thus goes up to 40 Mbps for the whole network. In FIG. 1, intrusion movement 110 is depicted with a thick black line and the shaded surface 112 denotes the region in which SNs 102 are activated by the intruder.

In another example embodiment, the network 100 is a position monitoring system for training purposes. A typical network contains 100 SNs and maximal rate is 100 kbps. A further example embodiment is a shelf management and monitoring system. The system is designed to accommodate up to 1000 SNs with rates of 10-100 kbps. Although all nodes will hardly ever all be active at the same time, the total aggregated input traffic of a network can easily go to tens of Mbps.

Another example is a fire detection sensor network. Sensors are distributed on an area, and their goal is to detect a fire and to monitor its spreading. The average traffic in such a network is of the low traffic type. However, in case of fire, there is a burst of traffic from those SNs that detect fire. Most of the information is redundant to some extent: it is sufficient to get packets from one sensor to detect fire. In order to get more precise information on fire spreading, more data packets should be captured.

Summarizing the above facts, sensor networks 100 may have lower average data rates and a multiplicity of nodes, but may be confronted with higher peak data rates. A network architecture is proposed to better handle the burst periods of peak transmission rates, defined by these examples, and which will also be efficient in low-traffic periods.

SNs 102 are designed to use given coding and modulation schemes. These schemes are fixed since SNs 102 do not interact with the environment. A reception of a packet at a CH 104 will be successful if the signal strength is high enough, and if the level of the interference coming from concurrent transmissions is low enough.

The goal of the CHs 104 is to successfully receive packets from SNs 102. If a sensor network 100 is lightly loaded, the preferred strategy of a CH 104 is to try to decode every packet it senses on the medium. Since CHs 104 do not control sensors' medium access, they cannot prevent transmission failures that occur due to collisions.

However, the story is different when a network load is higher. A typical wireless receiver has only a single receiving circuit, thus can receive only one packet at a time. While a CH 104 is receiving a packet from a distant SN 102, another transmission may start from a near-by SN 102. This transmission will interfere and may corrupt the already received packet. At the same time, the CH 104 will not be able to receive the interfering packet since its receiving circuit was busy when the transmission started. Hence, both packets will be corrupted and lost.

This problem can be overcome if a CH 104 is equipped with several receiving circuits. However, such a solution is rather expensive and more difficult to implement.

Two CH architectures are described. The first CH architecture is based on an adaptive detection threshold. Each CH 104 has a single receiver circuit with a detection threshold which is adapted as a function of the traffic sent by the SNs 102. It starts receiving a packet only if the received signal strength is above the detection threshold. In addition, the CH 104 tracks the SNs' 102 traffic intensity and constantly adapts the detection threshold.

The second CH architecture assumes that each CH 104 contains one receiving circuit, and an additional detection and synchronization circuit. A CH 104 starts receiving the first packet it observes on the wireless medium. The goal of the additional detection circuit is to monitor the medium in parallel, and to detect if a packet, stronger than the one currently being received, appears. If this happens, the receiving circuit drops the ongoing transmission and switches to the stronger packet.

Figure 2:
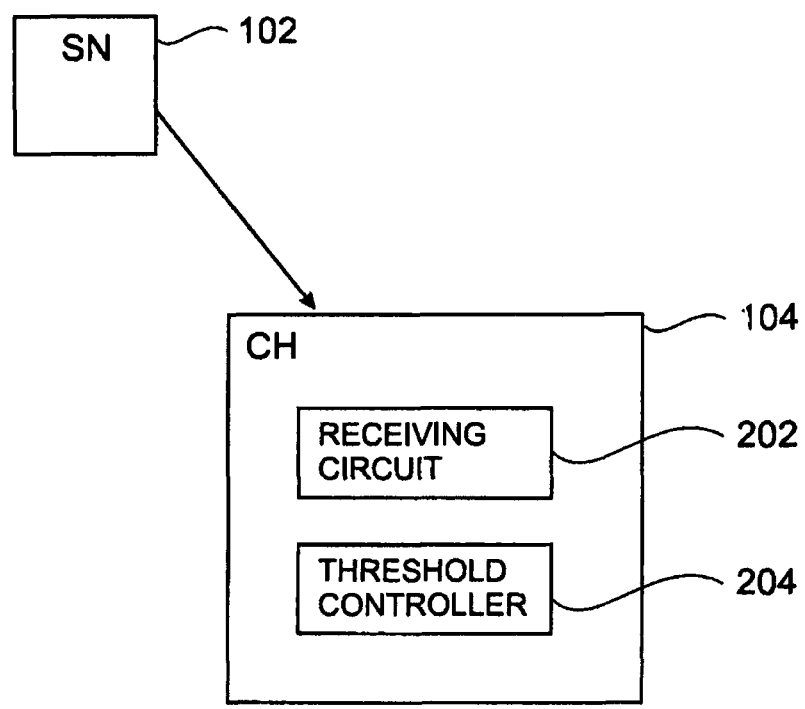
FIG. 2 is a block diagram a cluster head and a sensor node.

Referring to FIG. 2, a first CH architecture is shown. A CH 104 has a single receiving circuit 202 and a variable detection threshold controller 204. The variable detection threshold controller 204 detects the level of traffic from SNs 102 and determines a variable detection threshold, which is herein denoted with $P_{dt}$, which varies with the level of traffic. If the signal strength of a received packet from a SN 102 is lower than $P_{dt}$, then the packet will be ignored. Otherwise, the CH 104 will try to receive it. A packet is "detected" if the received signal is stronger than $P_{dt}$, only then will the CH 104 try to receive it.

Figure 3:
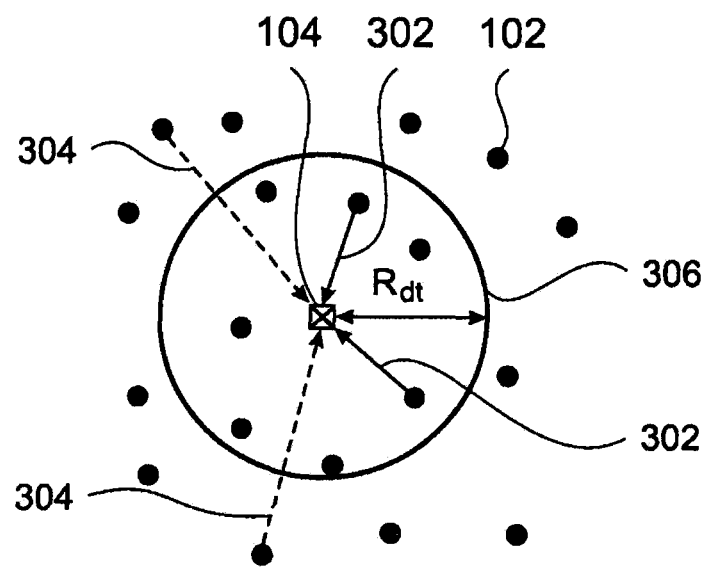
FIG. 3 is a schematic diagram illustrating a detection threshold.

For simplicity of presentation, it can be assumed that the signal attenuation is a time-invariant function of distance and that all SNs send with the same power. Referring to FIG. 3, a CH 104 is shown with surrounding SNs 102. There exists a threshold region of radius $R_{dt}$, such that if a SN 102 is outside this region, a CH 104 will not start receiving packets sent by this SN 102. In FIG. 3, transmissions of SNs 102 whose received signal at the CH 104 is higher than $P_{dt}$ are denoted with solid lines 302. The transmissions of SNs 102 whose received signal is below $P_{dt}$ are denoted with dashed lines 304. The equivalent detection region of radius $R_{dt}$ is represented with a shaded circle 306.

The main reason why a CH does not want to start receiving a packet is that if it starts receiving a packet whose signal strength is relatively low, there is a higher probability that the packet will be dropped due to collision. In the meantime, other packets, possibly with higher signal strength, will be rejected since the only receiving circuit is busy.

A drawback of this approach is that distant SNs, i.e. those outside the circle 306 will not be able to convey any information at all to the central server. However, this drawback is a consequence of the constraints on the SN architecture, and not of the protocol. Since SNs cannot adapt their medium access policy, there is no way to receive packets from distant SNs when the traffic is high, regardless of the CH architecture. Nevertheless, this problem can be mitigated in several ways. Firstly, a burst of traffic is usually triggered by an event. Therefore, even if some packets from distant SNs are dropped, not too much information might be lost due to a correlation among data. However, if a reliability of information is crucial, a simple solution is to add more CHs on critical places, to increase the capture probability. Since the number of CHs is anyway expected to be lower than the number of SNs, the solution will be cheaper than implementing a receiver in each SN.

In order to better understand this issue, a simple model of the system has been defined and analyzed analytically. It is assumed that the traffic distribution of every SN is Poisson. This is a reasonable assumption since if a system is heavily loaded; the preferred medium access for every SN is to defer each transmission for some random time. A simplified physical layer model is also assumed: if a CH receives a packet from a node with signal strength $P^{rev}$, and if an interfering packet, which overlaps even for a small fraction of time, comes with signal strength larger than $P^{rev}-\Delta$, then the received packet will be lost. This approximation has been tested on a physical model using networks with 2 nodes, and it was found that the approximation holds. This simplification neglects the impacts of multiple concurrent interferers, but it fits well with the simulated results.

The scenario depicted in FIG. 3 is considered with one CH and n SNs. Packets from SN i are received at the CH with signal strength $P^{rev}_i$. Each SN i generates a Poisson traffic with distribution $\lambda i$. Let the detection threshold be $P_{dt}$, which means that it is tried to decode packets whose received signal strength is larger than $P_{dt}$. The total traffic generated by the nodes is:

$$\lambda_a(P_{dt}) = \sum_{i: P^{rev}_i \geq P_{dt}} \lambda_i$$

The probability that the receiver is idle at any given moment in time is estimated. The receiver is idle if it has finished decoding a previous packet (successfully or unsuccessfully), and if no other packet has arrived in the meantime with received signal strength larger than $P_{dt}$. The state of receiver (busy or idle) is a stationary process in time the probability of receiver being idle is called $P^{rev}_{idle}$. This process can be described with a continuous Markov chain giving the stationary probability $P^{rev}_{idle} = 1/(1+\lambda_a(P_{dt}))$.

Next, the probability that a SN i will successfully transmit a packet is modeled. This will happen if the receiver is idle at the time a packet transmission starts, and if the packet does not overlap with any packet whose received signal strength is higher than $P^{rev}_i-\Delta$. It is assumed all packets have a fixed length and that the packet transmission time is one. Similar to non-slotted Aloha, if a packet arrives at time 0, then any other packet arriving within [−1, 1] will interfere with it and cause collision. Therefore, the packet capture probability of node i is:

$$P_{capture}(i, P_{dt}) = P_{idle}^{rcv}(P_{dt}) \exp\left(-2 \sum_{j: P_j^{rcv} \geq P^{rcv} - \Delta} \lambda_j\right)$$

The average throughput of SN i is then $\lambda_i P_{capture}(i, P_{dt})$ and the average throughput of all SNs is:

$$\bar{X}(P_{dt}) = \sum_{i: P_i^{rcv} \geq P_{dt}} \lambda_i P_{capture}(i, P_{dt}) \quad (1)$$

The problem of maximizing equation (1) can be solved numerically. For a multitude of topologies and traffic distributions, it has been found that it is always optimal to maintain a total traffic load $\lambda a=0.75$ which yields the efficiency of the medium $\bar{X}$ of 22%. In other words, $\lambda a$ ($P_{dt}$) should preferably be estimated and $P_{dt}$ varied to obtain $\lambda a=0.75$.

As described above, it is considered preferable to keep $\lambda_a=0.75$. A method is described to track the load $\lambda_a$ and utilization of the system $\bar{X}$, and to adapt $P_{dt}$ in order to keep the utilization at an increased level, ideally at the maximum level.

Figure 4:
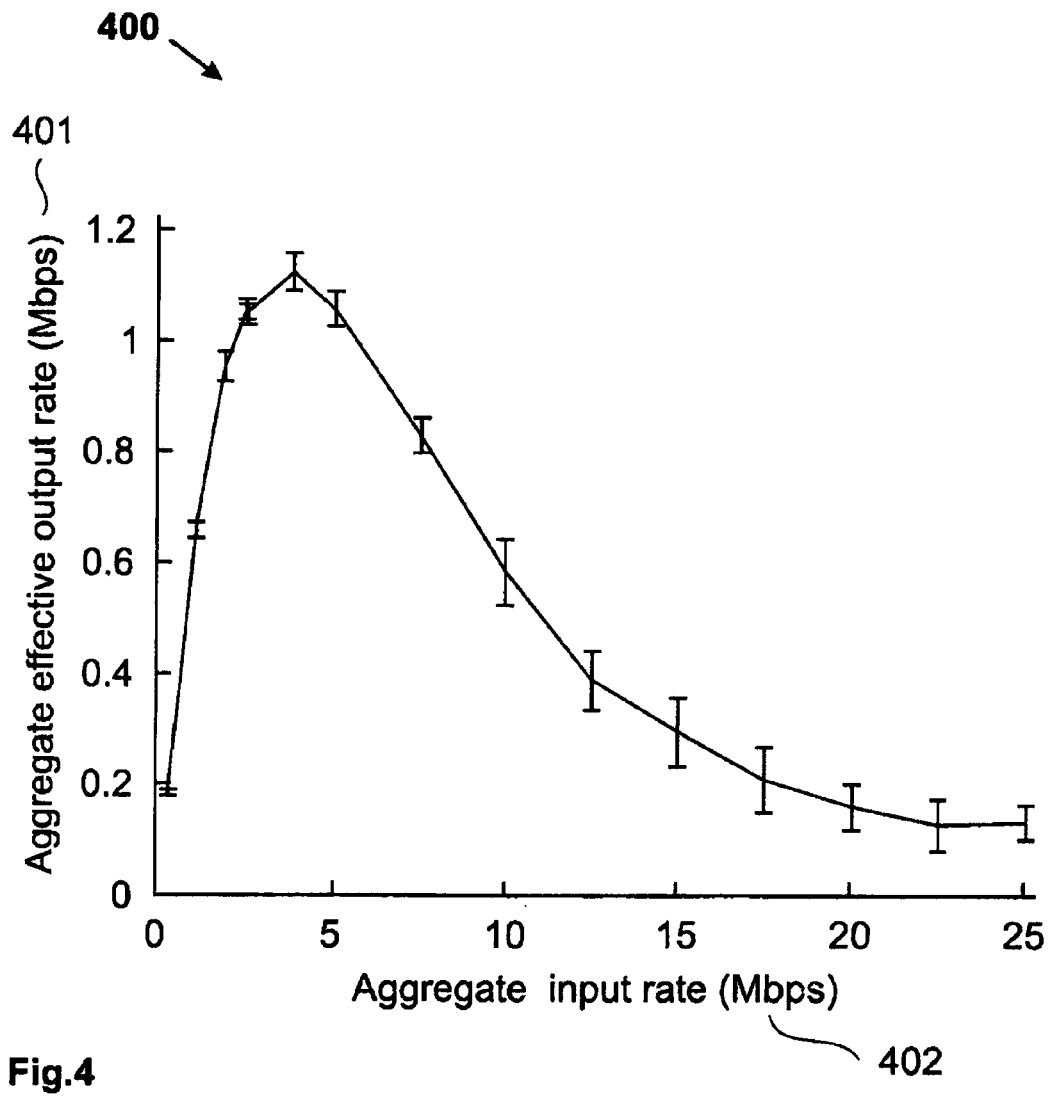
FIG. 4 is a graph showing aggregate input traffic against the aggregate output of a system.

The model is verified by simulations. 50 SNs are randomly distributed on a 40 m×40 m square with one CH in the middle. FIG. 4 shows a graph 400 with the aggregate input SN traffic on the x axis 401 and the aggregate effective output rate on the y axis 402 The physical link rate is 5 Mb/s. It can be seen in FIG. 4 that the effective output rate is maximal when the aggregate traffic is around 75% of the physical link rate. At that point, the effective output rate of the system is around 22% of the physical link rate.

A method is proposed to track load $\lambda_a$ and utilization of the system, and to adapt $P_{dt}$ in order to keep the utilization at a predetermined level.

Figure 5:
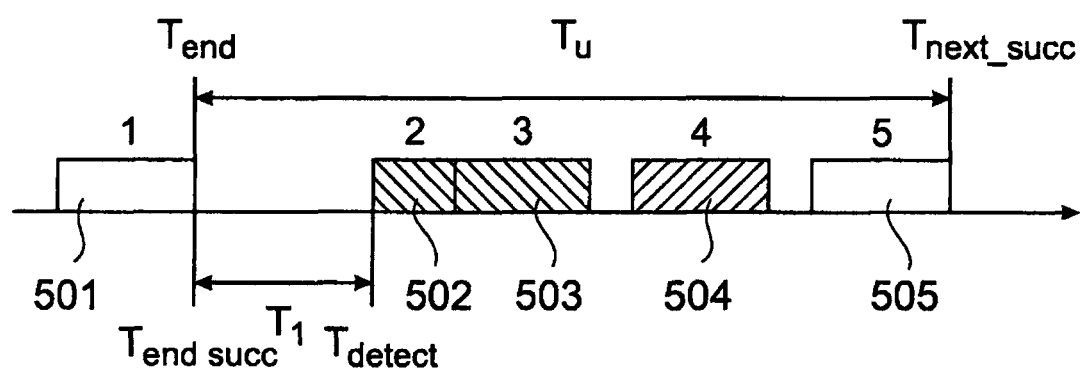
FIG. 5 is a diagram illustrating data packet arrivals at a cluster head.

FIG. 5 shows packets arriving at a CH shown along a timeline 400 and illustrates the adaptation mechanism. Packet 1 501 has arrived and is well received. Packet 2 502 was being received when it collided with packet 3 503 and is discarded. Packet 4 504 is not detected because it arrives from a node outside a detection threshold. Finally, packet 5 505 again is well received.

First, $\lambda_a$, is estimated. As shown in FIG. 5, $T_1$ is denoted as the average idle time at receiver that is the average time between two packets from sensors that are detected. The end time $T_{end}$ of the last detected packet (successfully or unsuccessfully received) is monitored and at the moment $T_{detect}$ when a new packet is detected, an update of the idle time is performed: $T_1=\alpha T_1+(1-\alpha)(T_{detect}-T_{end})$. The estimate of the intensity of detected load is then $\lambda_a$=packet duration/$T_1$.

A similar thing is done for estimating utilization $\bar{X}$. $T_u$ denotes the average time between two successful receptions. The time of the end of the last successful packet transmission is kept $T_{end\_succ}$. At the instant of the next successful packet transmission $T_{next\_succ}$, $T_u$ is updated. For updating, exponential weighted average is used $T_u=\alpha T_u+(1-\alpha)(T_{next\_succ}-T_{end\_succ})$. The estimate of the utilization is then $\bar{X}$=packet duration/$T_u$. The filter constant is set $\alpha=0.95$ in both cases.

In parallel, a CH also learns about existing SNs and their distances. This is done during packet receptions. A CH does not need necessarily to receive successfully a whole packet to perform this estimate. It might be sufficient to decode the header, and to estimate signal strength. As a result of this estimation a CH keeps a list of active sensors and their received signal strengths $\{i, P^{rev}_i\}_{i=1, \ldots, n}$, ordered decreasingly by signal strengths.

A preferable setting of the algorithm is to keep utilization at 22% and detected load at 75%. In theory it should be sufficient to use detected load as an estimator, but using both detected load and utilization provides better robustness. The adaptive threshold algorithm is initialized with $P_{dt}=0$, thus any SN can be detected. When packets start to be received, $T_1$, $T_u$ and the list of SNs are updated. Initially, at the bootstrap, the estimated detected load and utilization are lower. Once the detected load goes over 75% and at the same time the utilization drops below 22%, it means that the curve shown in FIG. 4 has passed over the top and hence $P_{dt}$ is too small and should be increased.

The decision on the value of the detection threshold happens every time a new packet is sensed on the medium. It is more dangerous to overestimate the detection threshold than to underestimate it. If the detection threshold is overestimated when the total input traffic is low (see the left side of the curve of FIG. 4), this means that the input traffic is further decreased and hence the effective output is further decreased. Similarly, when the total input traffic is high (see the right side of the curve of FIG. 4), if the detection threshold is underestimated, the total number of detected packets is increased and again this decreases the effective output rate. However, the potential loss when overestimating the detection threshold is higher. The line between low traffic and high traffic is referred to as intensity threshold. This threshold is here exemplarily set as the combination of a predetermined value, e.g. 75%, of load and a predetermined value, e.g. 22%, of utilization. Those two values can be monitored independently and the situation of the load or utilization being lower or higher than the predetermined values can then be used to trigger the adaptation of the detection threshold. It is possible to logically combine the two values with an AND. OR or XOR operator and thereby achieve different resulting packet reception. The type of combination can be selected different for the cases of increasing versus decreasing the detection threshold.

An AND connection for increasing traffic leads to a so called conservative adaptation. A conservative increase of $P_{dt}$ is preferably performed: if it happens e.g. 4 times in a row that the detected load is higher than 75% and the utilization lower than 22%, only then will the detection threshold be increased. The detection threshold is increased such that one SN less will be detected from thereon. In other words, if it is assumed that $P_{dt}=P^{rev}_i$, then $P_{dt}=P^{rev}_{i-1}$, is updated if i>1.

On the other hand, when decreasing the detection threshold, the process can be less conservative. The first moment when the detected load is lower then 75% and the utilization is lower than 22%, then $P_{dt}$ is set to $P_{dt}=P^{rev}_{i+i}$ if i<n, or else $P_{dt}=0$.

The main reason for doing a conservative increase of the threshold is because the curve of FIG. 4 is steeper for low traffic intensity. The detected traffic intensity depends on the detection threshold. The higher the detection threshold is, the lower the detected traffic is.

If the traffic is overestimated, the detected traffic will be decreased. This will most likely happen when the total traffic is already low, hence when the operating point is on the left side of the peak. Since the curve is steeper, the utilization is going to suffer more strongly, and this should be avoided.

On the other hand, if the aggregate traffic is underestimated, it will be on the right side of the curve of FIG. 4. There, the steepness of the curve is smaller, hence an underestimate of the threshold will cause a smaller change in utilization, and it is possible to be less conservative.

It is also advantageous to keep updating $T_1$ and $T_u$ even when no packet arrivals are being detected. In the event when the traffic intensity suddenly drops, or nearby nodes cease transmitting, the detection threshold might be too high. If a new packet arrives at time $T_{now}$, the following values of $\lambda_a$, $\overline{X}$ are taken:

$$\lambda_a = \frac{packet\_duration}{\alpha T_1 + (1-\alpha)(T_{now} - T_{end})}$$

$$\overline{X} = \frac{packet\_duration}{\alpha T_u + (1-\alpha)(T_{now} - T_{end\_succ})}$$

This way, the detection threshold will gradually drop in time while there is no detected packet.

Figure 6:
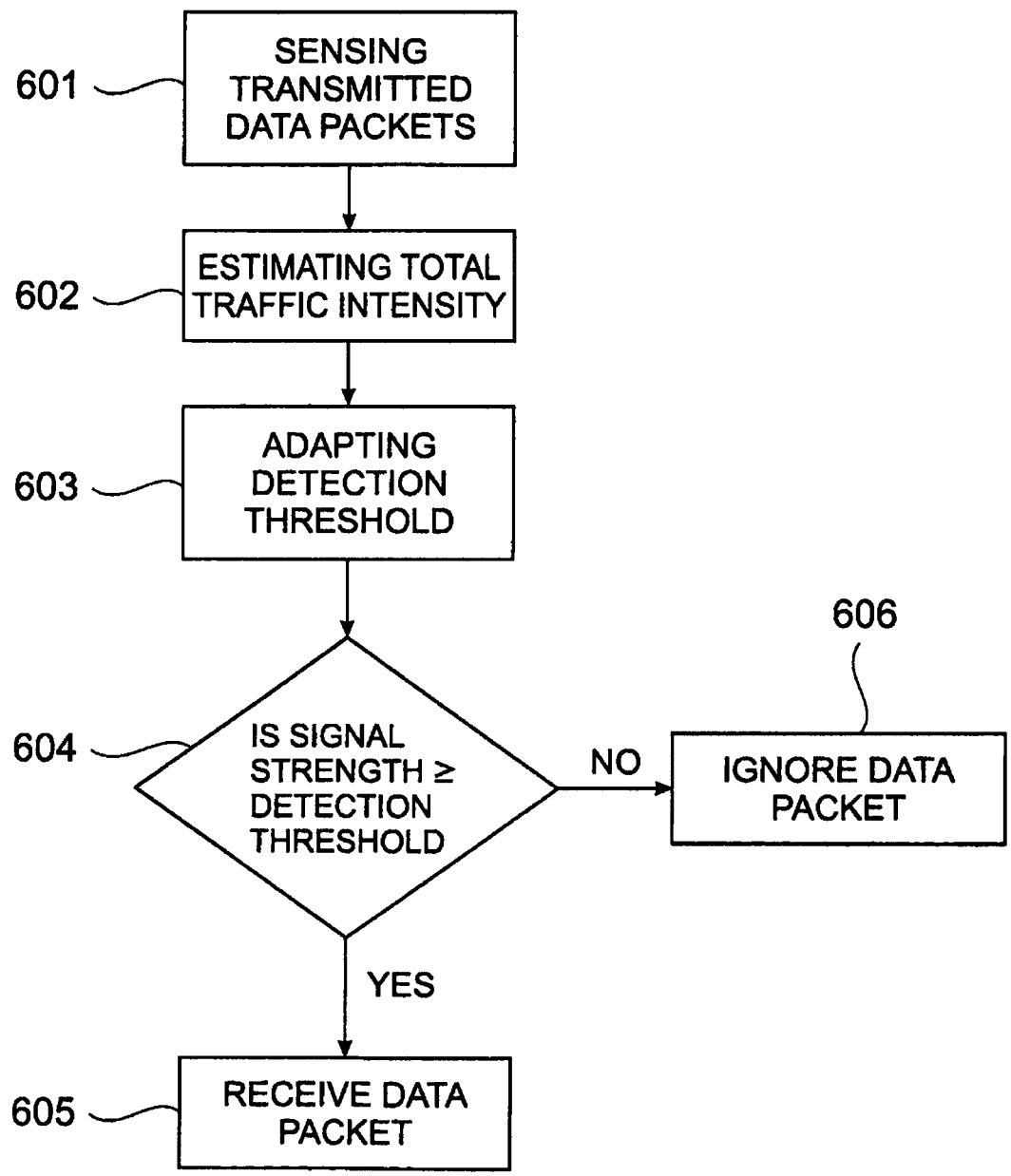
FIG. 6 is a flow diagram of a method of receiving data at a cluster head.

FIG. 6 is a flow diagram of a method of receiving data packets at a cluster head from transmitting devices in a sensor network. The method includes sensing 601 data packets transmitted on a communication medium. The total traffic intensity of data packets generated by the transmitting devices is estimated 602. A detection threshold is adapted 603 for receiving data packets as a function of the total traffic intensity.

It is determined 604 if the received signal strength of a received data packet is greater than or equal to the detection threshold. If it is greater than or equal to the threshold, the data packet is received 605. If it is less than the threshold, the data packet is ignored 606.

The following is the pseudo code of operations. Operation start_transmission(j) is called at a CH when a packet from node j is sensed. Operation end_transmission(j) is called when a packet transmission is finished. End_transmission(j) is called only if a packet was detected, i.e. the received signal strength is above the detection threshold $P_{dt}$.

```
Start Transmission (from Node j):
lambda_a = packet_duration
        / (ALPHA * T_l + (1-ALPHA) * (now - T_end));
X = packet_duration
        / (ALPHA * T_u + (1-ALPHA) * (now - T_end_succ));
if (X < 0.22) count = count + 1;
else count = 0;
if (lambda_a < 75% and X < 22%)
begin
    i = i+1;
    P_dt = Prcv_i;
    count = 0;
end
else if (count >= 4 and lambda_a > 75% and X < 22%)
begin
    i = i-1;
    P_dt = Prcv_i;
    count = 0;
end
if (Prcv_j >= P_dt)
begin
    // Receive
    T_l = ALPHA * T_l + (1-ALPHA) * (now - T_end);
    lambda_a = packet_duration / T_l;
end
End_Transmission:
if (successfully_received)
begin
    t_u = ALPHA * t_u + (1-ALPHA) * (now - last_rcv);
    util = packet_duration / utime;
    T_end_succ = now;
end
if (packet_was_detected) T_end = now;
```

Figure 7A:
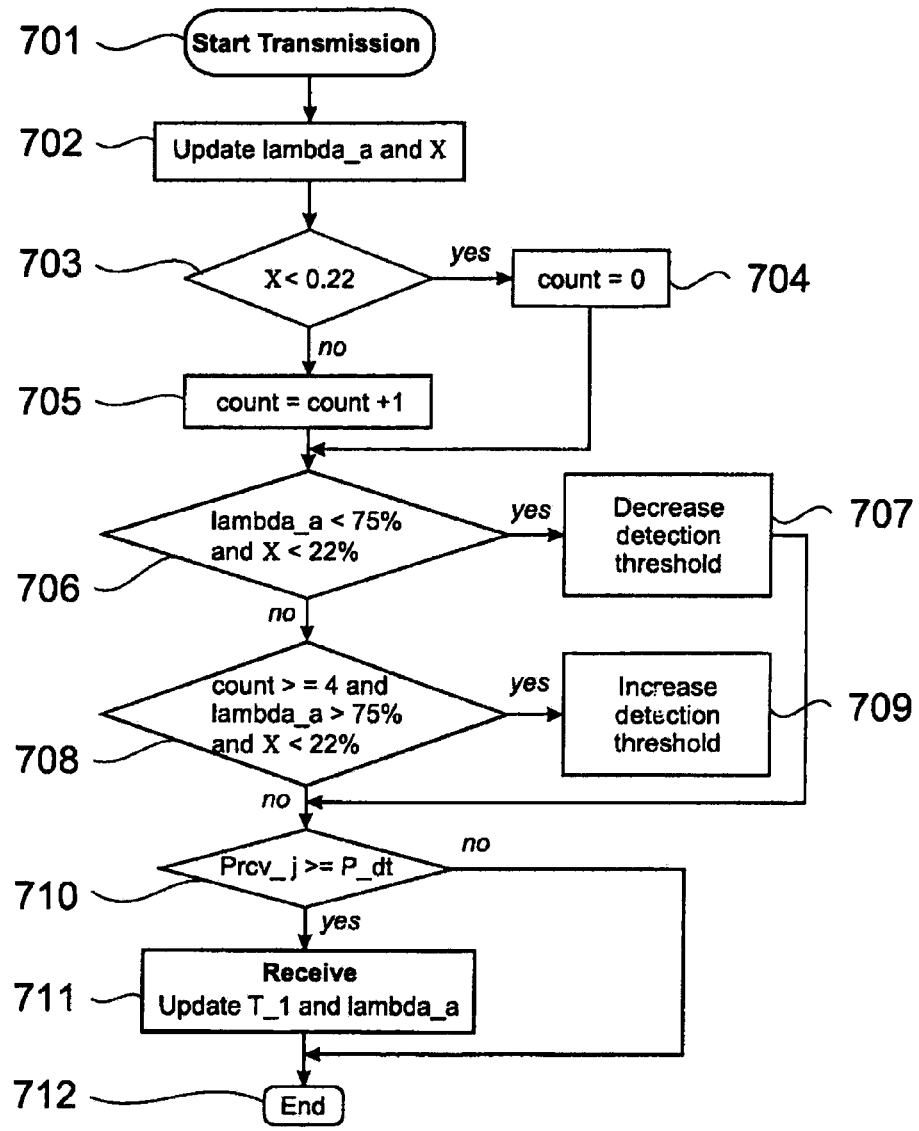
FIGS. 7A and 7B are flow diagrams of further details of a method of receiving data at a cluster head.
Figure 7B:
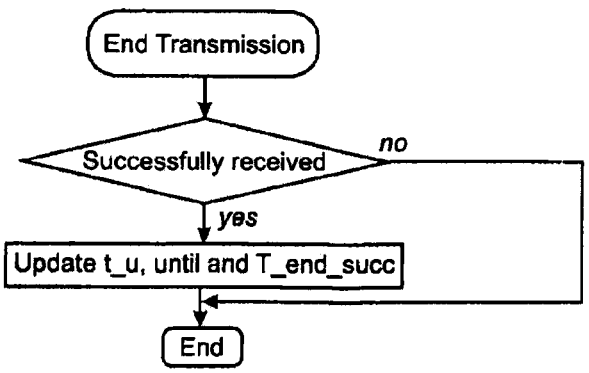

FIGS. 7A and 7B are flow diagrams showing the steps of the above algorithms. Referring to FIG. 7A, the transmission is started 701, and the total traffic intensity $\lambda_a$ and utilization $\overline{X}$ are updated 702. It is determined if the utilization is less than 22% 703; if it is, the count is equal to zero 704, if not the count is incremented by one 705.

It is then determined 706 if the total traffic intensity is less than 75% and the utilization is less than 22%. If yes, the detection threshold is decreased 707. If not, it is determined 708 if the count is greater than or equal to 4 and the total traffic intensity is greater than 75% and the utilization is less than 22%. If yes, the detection threshold is increased 709.

It is determined 710 if the signal strength of the packet received from SN j is greater than or equal to the detection threshold. If yes, the signal packet is received 711 and the average idle time of the receiver $T_1$ and the total traffic intensity are updated. The transmission then ends 712.

If the signal strength is less than the detection threshold, no packet is received and the transmission ends 712.

Referring to FIG. 7B, when a transmission ends 712, it is determined 713 if the packet was successfully received. If yes the average time between two successful receptions $T_u$, the utilization and the time of the end of the last successful packet transmission $T_{end\_succ}$ are updated 714 and the process ends 715. If the transmission is not successful, the process ends 715.

As shown in FIG. 5, the main reason for a too low efficiency of a CH is that if it starts receiving a weaker packet, and a stronger packet arrives during this reception, the weaker packet will be dropped due to the interference, and the stronger packet will not be received because the receiving circuit was busy when the packet arrived. The most general way to solve this problem is to include several receiving circuits in parallel so that a CH can cope with all arriving packets. However, this is not necessary in most of the cases. A solution is provided that offers a similar performance while being simpler and cheaper to implement.

Figure 8:
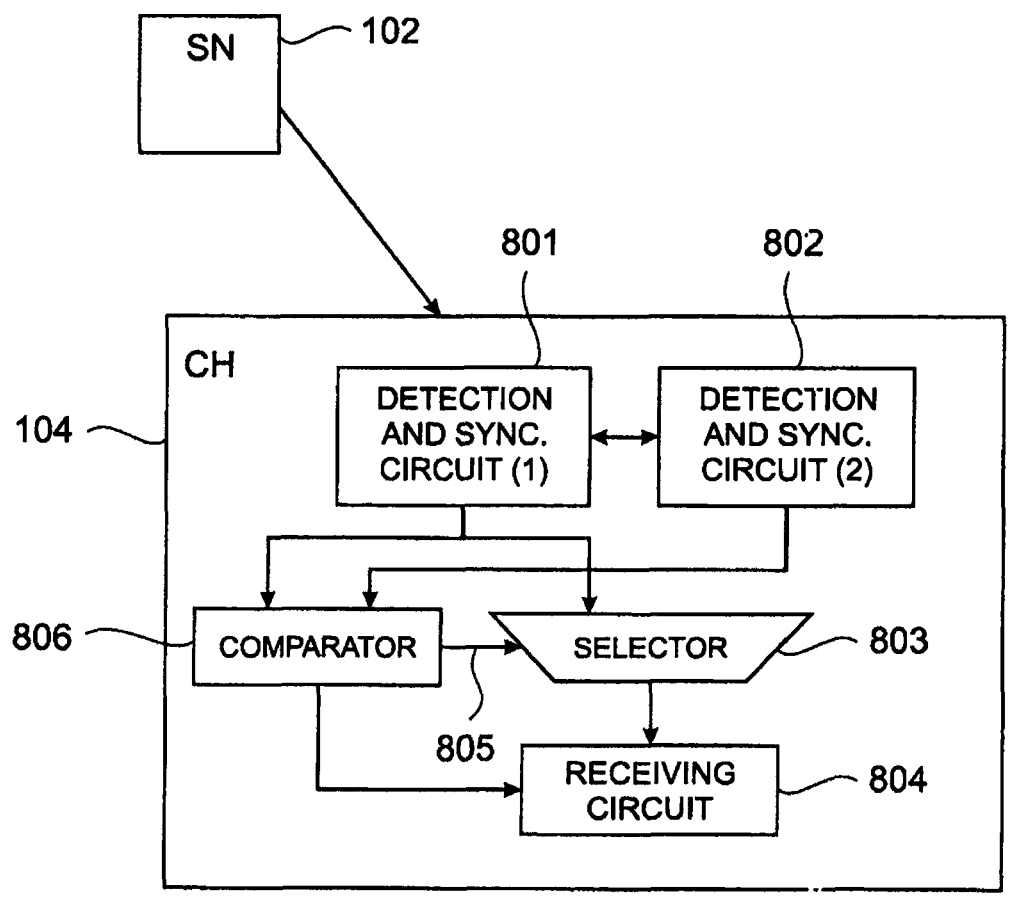
FIG. 8 is a block diagram of a cluster head and a sensor node with two detection and synchronization circuits.

Referring to FIG. 8 a second CH architecture is shown. A CH 104 has two detection and synchronization circuits 801, 802. Each one of the detection and synchronization circuits 801, 802 can detect and synchronize with an arriving packet from a SN 102. There is communication between the two circuits 801, 802 in order to avoid both circuits 801, 802 detecting the same packet. Detection of the same packet by both circuits 801, 802 is a risk when both circuits 801, 802 are idle.

Once one of the detection and synchronization circuits 801, 802 synchronizes to a packet, it forwards the data to a selection multiplexer 803. The selection multiplexer 803 has both signals as inputs and it selects one of the signals to forward to the receiving circuit 804. The selection is based on a control input 805 set by a comparator 806.

The comparator 806 takes both input signals from the two detection and synchronization circuits 801, 802, estimates the powers, and selects the one with a higher power. The comparator 806 then sets the control input 805 to the selection multiplexer 803 accordingly. Also, when the comparator 806 detects an arrival of a stronger input signal, it changes the output of the selection multiplexer 803. The comparator 806 also informs the receiving circuit 804 of the change, so that the receiving circuit 804 knows it is switching to a new packet.

In this way, if a transmission of a new packet starts whose signal is stronger than the signal of the packet currently being received, and if it overlaps with the current packet, the CH 104 stops receiving the current packet and switches to the new, stronger packet.

Figure 9:
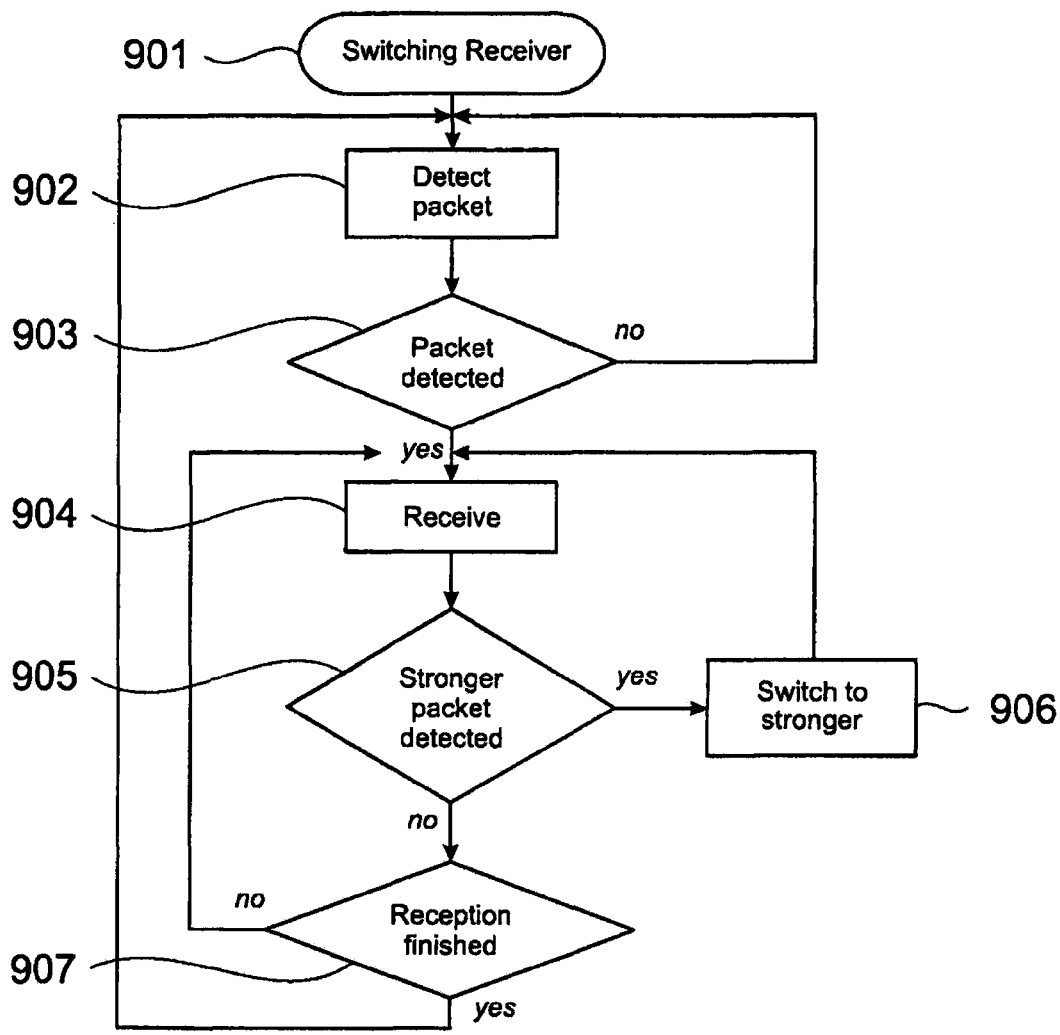
FIG. 9 is a flow diagram of a method of receiving data at a cluster head designed according to FIG. 8.

FIG. 9 is a flow diagram of the method of receiving a signal packet using the second CH architecture in the form of a switching receiver 901. A packet is detected 902 and it is determined 903 if a packet has arrived. If no packet has arrived, the receiver continues to detect packets. Packet receiving is performed 904. It is then determined 905 if a stronger packet is detected. If yes, the receiver switches to receiving the stronger packet 906 and the method loops to the step of receiving 904. If no stronger packet is detected, it is determined 907 if the reception is finished. If it is finished, the method loops to detecting further packets 902. If it is not finished, the method loops to receiving 904 the packet.

The approach with the adaptive detection threshold yields an improvement comparing to known architectures, while maintaining the same level of architectural complexity. The switched architecture introduces an additional performance improvement but with a slight increase in CH production cost.

It is also possible to use a method for receiving data from a plurality of transmitting devices at a receiving device, comprising: detecting a first data packet with a first signal strength; detecting a second data packet with a second signal strength; comparing the first and second signal strengths; receiving the data packet with the stronger signal strength. The first and second data packets may be detected in parallel. The method may include: receiving a first data packet with a first signal strength; detecting a second data packet with a second signal strength during the receiving process of the first data packet; determining if the second signal strength is greater than the first signal strength; discontinuing the receipt of the first data packet and switching to the second data packet if the second signal strength is greater than the first signal strength.

This method can be performed by a receiving device for receiving data packets from a plurality of transmitting devices, comprising: first and second detection circuits for detecting the arrival of data packets; a controller for comparing the signal strengths of detected data packets and selecting a data packet with the strongest signal strength; a receiving circuit for receiving the selected data packet. The detection circuit may detect the arrival of a second data packet with a greater signal strength than the signal strength of a first data packet in the process of being received by the receiving circuit, and the controller instructs the receiving circuit to discontinue the receipt of the first data packet and switch to the second data packet. The controller may include a comparator for estimating and comparing the signal strengths of data packets and a selection multiplexer for forwarding the selected data packet to the receiving circuit.

Any of the above embodiments can be combined in part or as a whole. The present invention can be implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for receiving data from a plurality of transmitting devices at a receiving device, comprising:
    detecting a first data packet with a first signal strength, and receiving the first data packet;
    detecting a second data packet with a second signal strength, during the receiving of the first data packet;
    comparing the first and second signal strengths;

determining that the second signal strength is greater than the first signal strength;

discontinuing a receipt of the first data packet and receiving and switching to a receipt of the second data packet in response to the determination that the second signal strength is greater than the first signal strength; and multiplexing the second data packet with the greater signal strength responsive to comparing the first and second signal strengths.

2. The method of claim 1, wherein the first and second data packets are detected in parallel.

3. The method of claim 1, wherein the method includes maintaining a list of active transmitting devices whose packets are sensed and the received signal strengths of the active transmitting devices.

4. The method of claim 1, wherein the method further includes sending the received the data packet with the stronger signal strength to a server.

5. An article of manufacture comprising a non-transitory computer usable medium having computer readable program code means embodied therein for causing reception of data packets from a plurality of transmitting devices at a receiving device, the computer readable program code means in said article of manufacture comprising computer readable program code means for causing a computer to effect the steps of claim 1.

6. A receiving device for receiving data packets from a plurality of transmitting devices, comprising:
   first and second detection circuits for detecting the arrival of data packets;
   a controller for comparing signal strengths of the detected data packets and selecting one of the detected data packet with a strongest signal strength;
   a receiving circuit for receiving the selected data packet;
   a detection circuit that detects an arrival of a second data packet with a greater signal strength than a signal strength of a first data packet in the process of being received by the receiving circuit, and the controller instructs the receiving circuit to discontinue a receipt of the first data packet and switch to a receipt of the second data packet in response to an determination that the second data packet has the greater signal strength than the first data packet; and
   a multiplexing circuit for multiplexing the second data packet with the greater signal strength responsive to comparing the signal strengths of the first and second data packets.

7. The receiving device of claim 6, wherein the controller includes a comparator for estimating and comparing the signal strengths of data packets and a selection multiplexer for forwarding the selected data packet to the receiving circuit.

8. The receiving device of claim 6, wherein the device includes at least one of:
   a sensor for data packets on a communication medium at the receiving device, and
   a list of active transmitting devices whose packets are sensed and their received signal strengths.

9. The receiving device of claim 6, wherein the data packets are detected in parallel.

10. A computer program product comprising a non-transitory computer usable medium having computer readable program code means embodied therein for causing reception of the data packets from a plurality of transmitting devices at a receiving device, the computer readable program code means in said computer program product comprising computer readable program code means for causing a computer to effect the functions of claim 6.

11. A sensor network comprising:
    a plurality of wireless sensors having transmitters;
    one or more receiving devices comprising:
    first and second detection circuits for detecting the arrival of data packets transmitted from the plurality of wireless sensors;
    a controller for comparing the signal strengths of the detected data packets and selecting one of the detected data packet with a strongest signal strength; and
    a receiving circuit for receiving the selected data packet, wherein the controller includes a comparator for estimating and comparing signal strengths of the detected data packets;
    wherein the controller instructs the receiving circuit to discontinue a receipt of a first data packet and switch to a receipt of a second data packet upon a detection of an arrival of the second data packet with a greater signal strength than a signal strength of the first data packet in a process of being received in response to an determination that the second data packet has the greater signal strength than the first data packet; and
    a selection multiplexer, in the controller, for forwarding the second data packet with the greater signal strength to the receiving circuit responsive to comparing the signal strengths of the first and second data packets.

12. The network of claim 11, wherein the one or more receiving devices include a transmitter.

13. The network of claim 11, wherein the network includes a server operative to receive data transmitted from the receiving circuit.

14. The network of claim 11, wherein the network operates on a pulse-based ultra-wide band physical layer.

15. The network of claim 11, wherein the data packets are detected in parallel.

16. A computer program product comprising a non-transitory computer usable medium having computer readable program code means embodied therein for causing reception of the data packets from a plurality of transmitting devices at a receiving device, the computer readable program code means in said computer program product comprising computer readable program code means for causing a computer to effect the functions of claim 11.

* * * * *